United States Patent [19]
Schaefer et al.

[11] Patent Number: 5,842,405
[45] Date of Patent: Dec. 1, 1998

[54] ECCENTRIC ARRANGEMENT FOR A RECIPROCATING PISTON PUMP

[75] Inventors: Ernst-Dieter Schaefer, Brackenheim; Guenter Krenz, Steinheim, both of Germany

[73] Assignee: Robert Bosch GmbH, Stuttgart, Germany

[21] Appl. No.: 882,212

[22] Filed: Jun. 25, 1997

[30] Foreign Application Priority Data

Jun. 27, 1996 [DE] Germany ............. 196 25 686.0

[51] Int. Cl.⁶ ............................................. F16J 1/10
[52] U.S. Cl. .................. 92/84; 92/129; 92/138; 92/72; 417/273
[58] Field of Search ............... 92/84, 129, 138, 92/12.1, 72; 417/273

[56] References Cited

U.S. PATENT DOCUMENTS

| 3,578,830 | 5/1971 | Pitner ............................. 92/84 |
| 3,612,728 | 10/1971 | Fulmer ........................... 417/415 |
| 3,866,480 | 2/1975 | Elliston .......................... 74/61 |
| 5,039,283 | 8/1991 | Mergenthaler et al. . |
| 5,348,382 | 9/1994 | Ebaugh et al. .................. 303/116.4 |
| 5,375,982 | 12/1994 | Joosse et al. ................... 92/84 |
| 5,642,988 | 7/1997 | Zorn ............................... 417/273 |

FOREIGN PATENT DOCUMENTS

| 23 36 973 | 2/1985 | Germany . |
| 42 41 827 A1 | 6/1994 | Germany . |
| 1 140 073 | 1/1969 | United Kingdom . |
| 94/13518 | 6/1994 | WIPO . |

Primary Examiner—Thomas E. Denion
Attorney, Agent, or Firm—Edwin E. Greigg; Ronald E. Greigg

[57] ABSTRACT

The present invention relates to an eccentric arrangement for a reciprocating piston pump, having a drive shaft drivable by a drive device, an eccentric part of a rubber-elastically deformable material is disposed on the drive shaft in a manner fixed against relative rotation. A bearing ring is provided on an outer circumferential surface of the eccentric part, by which ring a reciprocating piston is displaceable driven substantially perpendicular to the drive shaft. To avoid stroke losses, first and second support faces are provided on the drive shaft which the eccentric part disposed between them in such a way that the eccentric part rests with its axial ends on the first and second support faces.

20 Claims, 3 Drawing Sheets

ECCENTRIC ARRANGEMENT FOR A RECIPROCATING PISTON PUMP

FIELD OF THE INVENTION

The invention relates to an eccentric arrangement for a reciprocating piston pump as defined hereinafter.

BACKGROUND OF THE INVENTION

In a known radial piston pump (German Patent Application DE 23 36 973 A1), a cam is disposed as an eccentric part on a drive shaft, driven by an electric motor, for instance, and the cam path is formed by an outer race of a roller bearing. A reciprocating piston of a pump element is in engagement with the cam path, so that upon a rotational motion of the eccentric cam it is displaced back and forth at right angles to the drive shaft. To reduce the transmission of vibration from the cam to the reciprocating piston, a sliding body of elastic plastic is inserted into the drive end of the reciprocating piston; in a proportion that is inserted into a recess in the reciprocating piston, the sliding body has an annular axial recess.

An eccentric arrangement of the type referred to at the outset is contemplated in another known radial piston pump (German Patent Application DE 42 41 827 A1). This known eccentric arrangement includes a drive shaft, driven by an electric motor, on which an eccentric part of an elastomer material is arranged. A bearing ring is disposed on the outer circumferential face of the eccentric part, and two diametrically opposed reciprocating pistons disposed perpendicular to the drive shaft rest slidingly on the bearing ring.

While using an eccentric part of elastomer material to damp the transmission of sound between the pump and the electric motor housing, so that noise abatement can be attained, nevertheless there is a lift loss, since the elastomer eccentric part is compressed whenever a corresponding force is exerted on it by the reciprocating piston.

Such lift losses make themselves felt problematically particularly in pumps that are intended to generate relatively high liquid pressures, since the elastomer eccentric part is compressed more and more markedly as the pump pressure rises. Moreover, the churning work that occurs during pump operation leads to cracks in the eccentric part and to increased wear.

OBJECT AND SUMMARY OF THE INVENTION

The eccentric arrangement has the advantage over the prior art that radial compression of the eccentric part, which could cause a lift reduction, is largely avoided, without impairing the damping action, required for noise abatement, of the eccentric part of rubber-elastically deformable material. Moreover, the axial bracing of the eccentric part allows a relatively short axial structural length, thus yielding a compact design of the eccentric arrangement.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
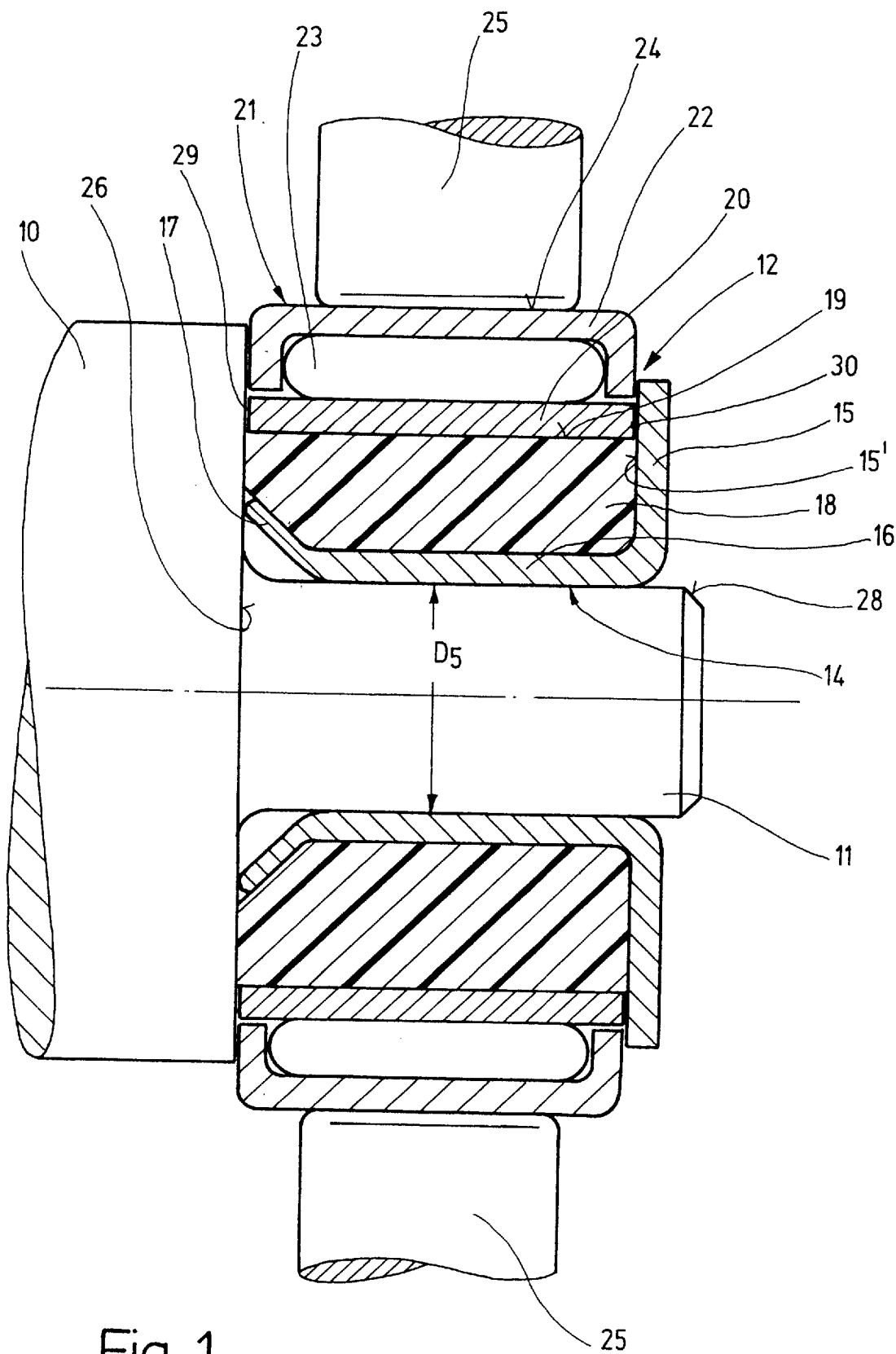
FIG. 1 is a schematic illustration, partly in section, of an eccentric arrangement according to the invention.

In the various drawing figures, components corresponding to one another are provided with the same reference numerals.

As FIG. 1 shows, the eccentric arrangement according to the invention includes a drive shaft 10 with a journal 11 on which an eccentric unit 12 is secured. The eccentric unit 12 has a bearing sleeve 14 with a radial flange 15, a sleeve portion 16, and a collar 17 that extends outward substantially in the form of a conical jacket from the sleeve portion 16. An eccentric part 18 of rubber-elastically deformable material, is inserted into the profile of the bearing sleeve 14, whose cross section is substantially L-shaped and a bearing ring 20 is mounted on the outer circumferential surface 19 of the deformable material.

The bearing ring 20 acts as the inner race of a roller bearing 21, whose outer race 22 is braced on the bearing ring 20 via roller bodies 23. The outer circumferential surface 24 of the outer race 22 acts as a bearing surface for elements to be driven by the eccentric arrangement, in particular for reciprocating pistons 25 of a radial piston pump.

The eccentric unit 12 is secured to the journal 11 of the drive shaft 10 in such a way, in particular being press-fitted or shrunk on, that the bearing sleeve 14, with the free end of its collar 17, and the eccentric part 18, with an axial end, rests on a shoulder 26 of the drive shaft 10 acting as a support face for the eccentric part 18, while the bearing ring 20 and the outer race 22 of the roller bearing 21 are spaced slightly apart from the shoulder 26.

Figure 2:
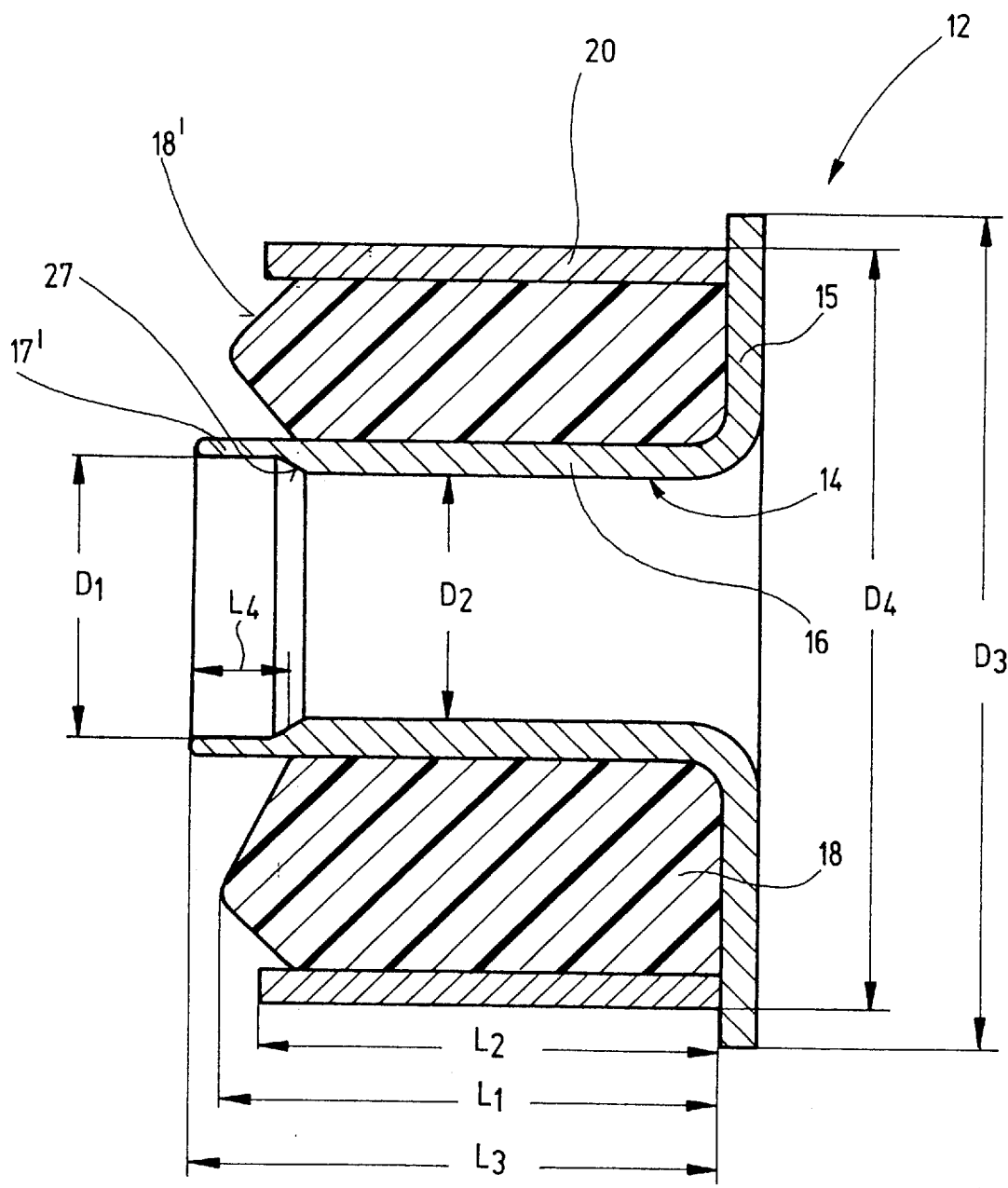
FIG. 2 is a section through a preassembled eccentric unit.

FIG. 2 shows a preassembled eccentric unit 12, on which the roller bodies 23 and the outer race 22 of the roller bearing 21 have not yet been arranged.

Before the eccentric unit 12 is secured to the journal 11 of the drive shaft 10, the bearing sleeve 14, on its end remote from the radial flange 15, has a cylindrical end portion 17', which axially adjoins the sleeve portion 16 and has a reduced wall thickness compared with the sleeve portion 16. Preferably, the outer circumferential surface of the cylindrical end portion 17' is flush with the outer circumferential surface of the sleeve portion 16, while its inner circumferential surface is offset radially outward compared to the corresponding inner circumferential surface of the sleeve portion 16, so that the inside diameter D1 of the bearing sleeve 14 is greater in the region of the cylindrical end portion 17' than its inside diameter D2 in the region of the sleeve portion 16. The cylindrical end portion 17' may, however, also be embodied such that both its inner circumferential surface and its outer circumferential surface are radially offset from the corresponding circumferential surfaces of the sleeve portion 16.

The eccentric part 18, resting with one axial end on the flange 15 and surrounded by the bearing ring 20 and disposed on the sleeve portion 16, has an end face 18' on its other axial end, which face is provided with a wedge-shaped or V-shaped profile. Instead of the profile shown, however, the end face 18' may also be provided with some other profile, preferably a convex profile. A semicircular or semi-elliptical cross section is also conceivable, for instance. The axial length L of the eccentric part 18 in the unassembled state is then greater than the axial length L2 of the bearing ring 20 but smaller than the common axial length L3 of the sleeve portion 16 and the cylindrical end portion 17'. The length L4 of the cylindrical end portion 17' is selected such that the transition, formed by a conical face 27, between the sleeve portion 16 and the cylindrical end portion 17' is located substantially in the region of the inner edge of the end face 18'.

In order to firmly hold a roller bearing 21, disposed on the bearing ring 20 or the eccentric part 18, in one axial direction, the outer diameter D3 of the flange 15 is selected to be greater than the outer diameter D4 of the bearing ring 20. In the other axial direction, the roller bearing 21 is retained by the shoulder 26, whose outer diameter is likewise greater than the outer diameter D4 of the bearing ring 20.

The completely preassembled eccentric unit 12 of the exemplary embodiment shown comprises the bearing sleeve 14, eccentric part 18 and bearing ring 20, on which ring the roller bodies 23 and the outer race 22 are also disposed in order to form the roller bearing 21. However, it is also possible for the outer circumferential surface of the bearing ring 20 to be embodied as a slide bearing face. Reciprocating pistons 25 or other elements to be driven can then be in sliding engagement with the bearing ring 20, optionally with the interposition of sliding blocks or the like.

When the eccentric arrangement is assembled, the completely preassembled eccentric unit 12 is slipped or press-fitted by its bearing sleeve 14 onto the journal 11 so as to be secured to the drive shaft 10, for instance by being shrunk on or pressed; the journal 11, whose free end has a chamfer 28, can be inserted easily into the bearing sleeve 14, since the outer diameter D5 of the journal 11, which is adapted to the inside diameter D2 of the bearing sleeve 14 in the region of the sleeve portion 16, is markedly smaller than the inside diameter D1 of the cylindrical end portion 17'. This operation of slipping or pressing the eccentric unit on is further facilitated by the cooperation of the chamfer 28 of the journal 11 with the conical face 27 on the inside circumference of the bearing sleeve 14.

In the process of slipping or pressing the eccentric unit 12 onto the journal 11, as soon as the free end of the cylindrical end portion 17' of the bearing sleeve 14 meets the shoulder 26, the cylindrical end portion is widened outward, forming the collar 17, as the slipping or pressing operation continues. In this process, the collar 17 presses with its outer jacket face against the profiled end face 18' of the eccentric part 18. Subsequently, the eccentric part 18, with its wedge-or V-shaped end face 18', meets the shoulder 26 and is compressed in the axial direction, until the bearing ring 20 strikes the shoulder 26. This concludes the slipping or pressing operation of the completely preassembled eccentric unit 12. After the conclusion of the slipping or pressing operation, the eccentric unit 12 resiliently rebounds slightly, so that gaps 29, 30, whose width is in the micrometer range, form between the ends of the bearing ring 20 and the shoulder 26 and flange 15, respectively.

Once the slipping or pressing on of the eccentric unit 12 ends, the eccentric part 18 of rubber-elastic material accordingly expands slightly again radially, thus creating gaps, not shown in detail, which permit a slight radial compression of the eccentric part 18.

The eccentric part 18 of rubber-elastically deformable material is thus virtually entirely encapsulated between the bearing sleeve 14, the bearing ring 20 and the shoulder 26 of the shaft 10. The eccentric part 18 is disposed in the axial direction between the shoulder 26, acting as a support face, and a support face 15' embodied on the flange 15. In the region of its end that rests on the shoulder 26, the eccentric part 18 rests on the collar 17 as well.

The eccentric part 18 of rubber-elastically deformable material is thus entirely encapsulated, except for the gaps, not shown, that are created by the assembly process described. The eccentric part 18 can thus be compressed slightly in the radial direction, so that the transmission of noise-producing vibration from the shaft 10 to the reciprocating pistons 25 or other elements to be driven, and vice versa, can be damped, while a greater radial deformation of the eccentric part 18 that would lead to a lift reduction is prevented.

Along with the avoidance of lift reduction, the encapsulated arrangement of the eccentric part 18 according to the invention has the advantage of preventing crack development and wear. The eccentric arrangement according to the invention thus has an increased service life, compared with the prior art. Moreover, the eccentric arrangement of the invention allows simple assembly, since the eccentric unit 12 can be entirely preassembled. It is also possible to dispense with additional parts, such as stop disks or the like.

The eccentric arrangement of the invention can be used for many applications, wherever a rotary motion must be converted into a substantially linear reciprocal motion. An especially preferred area of application of the eccentric arrangement of the invention is pumps, especially reciprocating or radial piston pumps, in which the reciprocating piston or pistons are to be acted upon simultaneously by one, two or more pump elements.

Figure 3:
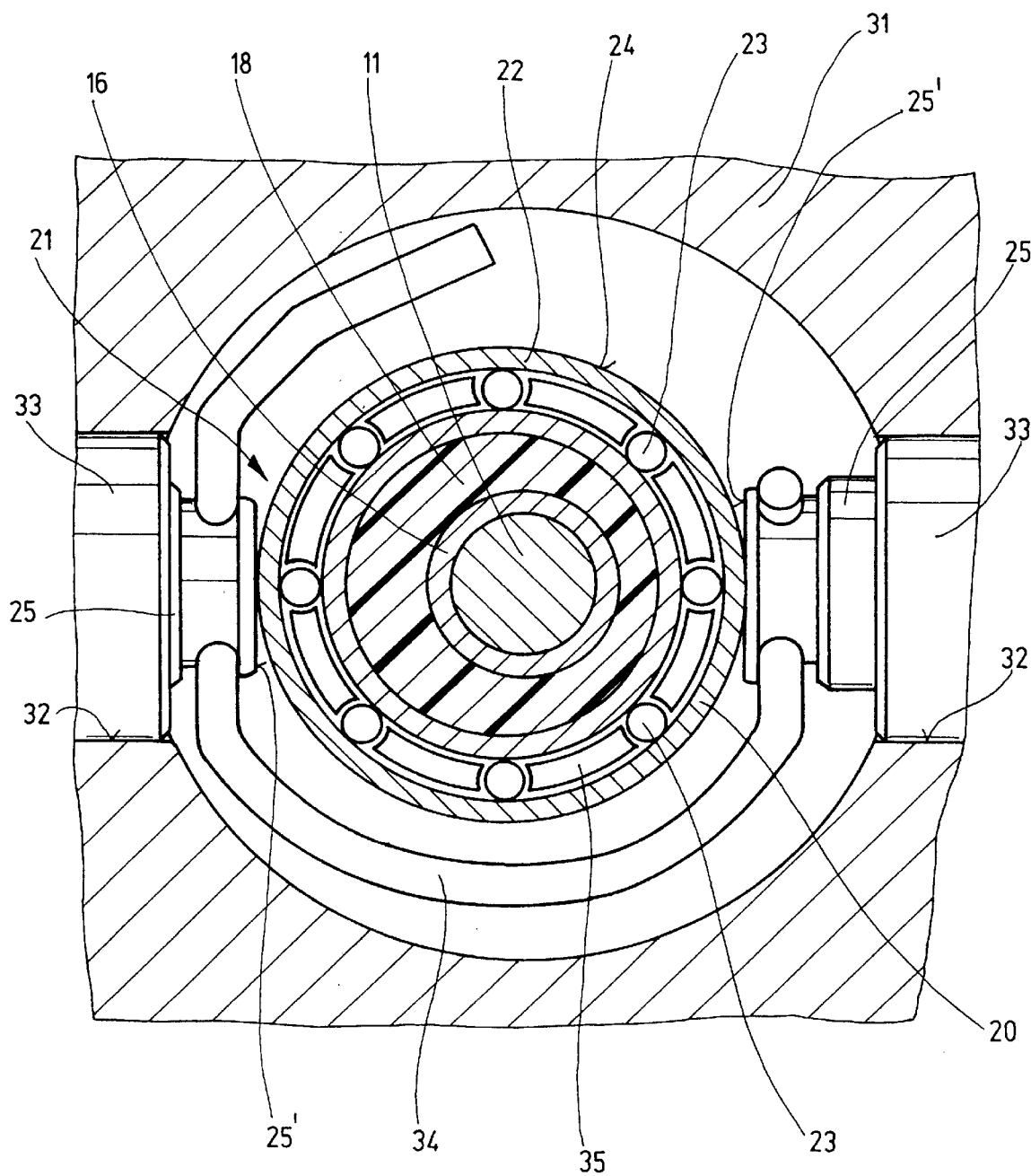
FIG. 3 is a section through a radial piston pump, in the region of an eccentric arrangement perpendicular to the drive shaft according to the invention.

FIG. 3 by way of example shows a radial piston pump with a pump housing 31 having chambers 32 in which pump elements 33 are disposed. The reciprocating pistons 25 of the pump elements 33 are connected to a clip spring 34, which keeps the end faces 25' of the reciprocating pistons 25 in contact with the outer circumferential surface 24 of the outer race 22 of the roller bearing 21. The roller bodies 23 of the roller bearing 21 are retained in a uniform circumferential spacing from one another in a known manner by a ball or roller cage 35.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. An eccentric arrangement for a reciprocating piston pump, comprising a drive shaft drivable by a drive device,
    an eccentric part comprising a rubber-elastically deformable material disposed on the drive shaft in a manner fixed against relative rotation,
    a bearing ring, provided on an outer circumferential surface of the eccentric part, said bearing ring drives a reciprocating piston, said reciprocating piston is displaceable substantially perpendicular to the drive shaft,
    first and second support faces (15', 26) are provided on the drive shaft (10), and the eccentric part (18) is disposed between said first and second support faces (15', 26) in such a way that the eccentric part (18) rests with oppositely disposed axial ends on the first and second support faces (15', 26).

2. An eccentric arrangement in accordance with claim 1, in which a first outside diameter (D3) of said first and second support faces (15', 26) is greater than a second outside diameter (D4) of the bearing ring (20).

3. An eccentric arrangement in accordance with claim 1, in which one axial end of the eccentric part (18), has a tapering profile at least in an unassembled state, and an axial spacing between the two support faces (15', 26) is smaller than a first length (L1) of the eccentric part (18).

4. An eccentric arrangement in accordance with claim 2, in which one axial end of the eccentric part (18), has a tapering profile at least in an unassembled state, and an axial spacing between the two support faces (15', 26) is smaller than a first length (L1) of the eccentric part (18).

5. An eccentric arrangement in accordance with claim 1, in which a spacing between the first and second support faces (15,', 26) is somewhat greater than a second length (L2) of the bearing ring (20), so that the bearing ring (20) is retained with slight play between the first and second support faces (15', 26).

6. An eccentric arrangement in accordance with claim 2, in which a spacing between the first and second support faces (15,', 26) is somewhat greater than a second length (L2) of the bearing ring (20), so that the bearing ring (20) is retained with slight play between the first and second support faces (15', 26).

7. An eccentric arrangement in accordance with claim 3, in which a spacing between the first and second support faces (15,', 26) is somewhat greater than a second length (L2) of the bearing ring (20), so that the bearing ring (20) is retained with slight play between the first and second support faces (15', 26).

8. An eccentric arrangement in accordance with claim 1, in which said first support face (15') is provided on a flange (15) of a bearing sleeve (14) retained on the drive shaft (10) in a manner fixed against relative rotation, while said second support face (26) is formed by a shoulder of the drive shaft (10).

9. An eccentric arrangement in accordance with claim 2, in which said first support face (15') is provided on a flange (15) of a bearing sleeve (14) retained on the drive shaft (10) in a manner fixed against relative rotation, while said second support face (26) is formed by a shoulder of the drive shaft (10).

10. An eccentric arrangement in accordance with claim 3, in which said first support face (15') is provided on a flange (15) of a bearing sleeve (14) retained on the drive shaft (10) in a manner fixed against relative rotation, while said second support face (26) is formed by a shoulder of the drive shaft (10).

11. An eccentric arrangement in accordance with claim 5, in which said first support face (15') is provided on a flange (15) of a bearing sleeve (14) retained on the drive shaft (10) in a manner fixed against relative rotation, while said second support face (26) is formed by a shoulder of the drive shaft (10).

12. An eccentric arrangement in accordance with the claim 8, in which the bearing sleeve (14), on an end remote from the flange (15), has an outward-extending collar (17), which rests with an outer jacket face on the eccentric part (18) and with a free end rests on the shoulder (26) of the drive shaft (10).

13. An eccentric arrangement in accordance with the claim 9, in which the bearing sleeve (14), on an end remote from the flange (15), has an outward-extending collar (17), which rests with an outer jacket face on the eccentric part (18) and with a free end rests on the shoulder (26) of the drive shaft (10).

14. An eccentric arrangement in accordance with the claim 10, in which the bearing sleeve (14), on an end remote from the flange (15), has an outward-extending collar (17), which rests with an outer jacket face on the eccentric part (18) and with a free end rests on the shoulder (26) of the drive shaft (10).

15. An eccentric arrangement in accordance with the claim 11, in which the bearing sleeve (14), on an end remote from the flange (15), has an outward-extending collar (17), which rests with an outer jacket face on the eccentric part (18) and with a free end rests on the shoulder (26) of the drive shaft (10).

16. An eccentric arrangement in accordance with claim 12, in which the bearing sleeve (14), in the unassembled state, has a cylindrical end portion (17) of reduced wall thickness on an end remote from the flange (15), form which end portion the outward-extending collar (17) is formed during assembly.

17. An eccentric arrangement in accordance with claim 16, in which a first inside diameter (D1) of the cylindrical end portion (17') is increased over a second inside diameter (D2) of the bearing sleeve (14) that corresponds to a third outside diameter (D5) of the drive shaft (10).

18. An eccentric arrangement in accordance with claim 1, in which a roller bearing (21), whose inner race is formed by the bearing ring (20), is disposed between the first and second support faces (15', 26) on the eccentric part (18).

19. A pump comprising an eccentric arrangement in accordance with claim 1, in which at least two reciprocating pistons (25), oriented in alignment with one another, are disposed diametrically opposite one another with respect to the drive shaft (10) and are in drive engagement with the eccentric arrangement.

20. The pump in accordance with claim 19, in which the at least two reciprocating pistons (25) are retained in engagement with the eccentric arrangement by a clip spring (34).

* * * * *